(12) United States Patent
Nakamura

(10) Patent No.: US 6,778,196 B2
(45) Date of Patent: Aug. 17, 2004

(54) MOUNTING A DISPLAY PANEL IN A COMPUTER

(75) Inventor: Fusanobu Nakamura, Kamisoyagi (JP)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 09/952,702

(22) Filed: Sep. 14, 2001

(65) Prior Publication Data
US 2003/0052856 A1 Mar. 20, 2003

(30) Foreign Application Priority Data
Sep. 14, 2000 (JP) ........................................ 2000-279999

(51) Int. Cl.$^7$ ................................................. G06F 1/16
(52) U.S. Cl. ...................... 345/905; 345/680; 345/681
(58) Field of Search .......................... 365/905; 361/679, 361/680, 681

(56) References Cited

U.S. PATENT DOCUMENTS

| | | | | |
|---|---|---|---|---|
| 4,859,092 A | * | 8/1989 | Makita | 400/83 |
| 5,548,478 A | * | 8/1996 | Kumar et al. | 361/681 |
| 5,644,469 A | * | 7/1997 | Shioya et al. | 361/681 |
| 5,818,360 A | * | 10/1998 | Chu et al. | 341/22 |
| 6,094,341 A | * | 7/2000 | Lin | 361/381 |
| 6,266,241 B1 | * | 7/2001 | Van Brocklin et al. | 361/687 |
| 6,341,061 B1 | * | 1/2002 | Eisbach et al. | 361/687 |
| 6,343,006 B1 | * | 1/2002 | Moscovitch et al. | 361/681 |
| 6,353,529 B1 | * | 3/2002 | Cies | 361/681 |
| 6,430,038 B1 | * | 8/2002 | Helot et al. | 361/681 |
| 6,464,195 B1 | * | 10/2002 | Hildebrandt | 248/460 |
| 6,480,373 B1 | * | 11/2002 | Landry et al. | 361/680 |

* cited by examiner

*Primary Examiner*—Regina Liang
*Assistant Examiner*—Duc Q Dinh
(74) *Attorney, Agent, or Firm*—Dillon & Yudell, LLP

(57) ABSTRACT

In a method for fixing an LCD panel on a notebook PC, spring latch holders are provided on the top of the LCD panel for fixing the LCD panel and the PC body together when the LCD panel is stored on the PC body. In a second aspect, side fins are provided on both sides of the bottom of the LCD panel, sidewalls are provided on both sides of a keyboard on the PC body, and the side fins are put on the sidewalls along the outer sides thereof so as to fix the LCD panel and prevent the side-to-side movement of the LCD panel. In a third aspect, projections are provided on backside edge portions at the bottom of the LCD panel, depressions for holding the projections are provided on the PC body, and the projections are engaged in the depressions to fix the LCD panel.

10 Claims, 7 Drawing Sheets

US 6,778,196 B2

MOUNTING A DISPLAY PANEL IN A COMPUTER

FIELD OF THE INVENTION

The present invention relates to the mounting of a display panel in a computer such as a notebook PC (Personal computer).

BACKGROUND OF THE INVENTION

A notebook PC generally consists of an LCD panel and a PC body, wherein the LCD panel can be raised from the PC body when a user uses the notebook PC, and the LCD panel can be stored on the PC body when the user carries the PC. FIG. 9 shows a notebook PC as an example of conventional notebook PCs, which is referred to as a clamshell type. In FIG. 9, the clamshell type notebook PC 51 consists of an LCD panel 52 and a PC body 53. This notebook PC 51 is configured to rotatably connect the LCD panel 52 and the PC body 53 with two hinges 54-1 and 54-2.

When the LCD panel 52 has a touch-panel function in addition to an information display function, it is generally required from the viewpoint of usability that the LCD panel 52 is not easily moved when it is pressed. However, if the touch panel function is used with the LCD panel 52 of FIG. 9, the operation of pressing a display portion 56 of the LCD panel 52 will tip back the LCD panel 52 or topple over the entire notebook PC 51. To avoid these situations, it has been necessary to increase the torque of the hinges connecting the PC body 53 and the LCD panel 52, or to make the PC body 53 larger or heavier so as to generate, by self weight, moment greater than that generated by the touch-panel operation.

As permitted by the design of the clamshell notebook PC 51, a user may open the hinges 54-1 and 54-2 as much as possible when using the touch-panel function because the LCD panel 52 is not further moved even when he strongly presses the LCD panel. However, the LCD panel 52 becomes distant from the user.

SUMMARY OF THE INVENTION

An object of the present invention is to provide a method for fixing an display panel on a notebook PC wherein operations such as information input can be performed without loss of usability.

Another object of the present invention is to provide a method for fixing a display panel on a notebook PC wherein an operator can set the display panel in a desired position.

According to one aspect of the invention, in a computer having a body and a display panel (e.g. LCD) connected by a hinge member, side fins are provided on both sides of the bottom of the display panel, sidewalls are provided on both sides of a keyboard on the body, and the side fins are put on the sidewalls along the outer sides thereof so as to fix the display panel and to prevent the side-to-side movement of the display panel. According to another aspect of the present invention, projections are provided on backside edge portions at the bottom of the display panel, depressions for holding the projections are provided on the body, and the projections are engaged in the depressions to fix the display panel. This configuration is preferred in that the motion of the panel can be restricted and the panel can be more firmly fixed to the body. In addition, having the side fins and projections in integral structure can realize this configuration more easily and is therefore preferred.

As a preferred implementation of a method for fixing the panel on the notebook PC according to the present invention, a first hinge is provided on the body, a second hinge is provided on the panel, and the first and second hinges are rotatably connected by an arm. This implementation is preferred in that the panel can be firmly fixed to any position and thus operations such as information input can be performed without loss of usability.

In the preferred implementation of the present invention, the first hinge is configured to rotate 0° through 90° given that the angle of the main surface of the notebook PC is 0°, and the second hinge is configured to rotate 0° through 180° given that the angle of a plane parallel to the arm is 0°. This configuration is preferred in that it can be applied to any implementation.

DETAILED DESCRIPTION OF THE PREFERRED EMBODIMENT

Figure 1:
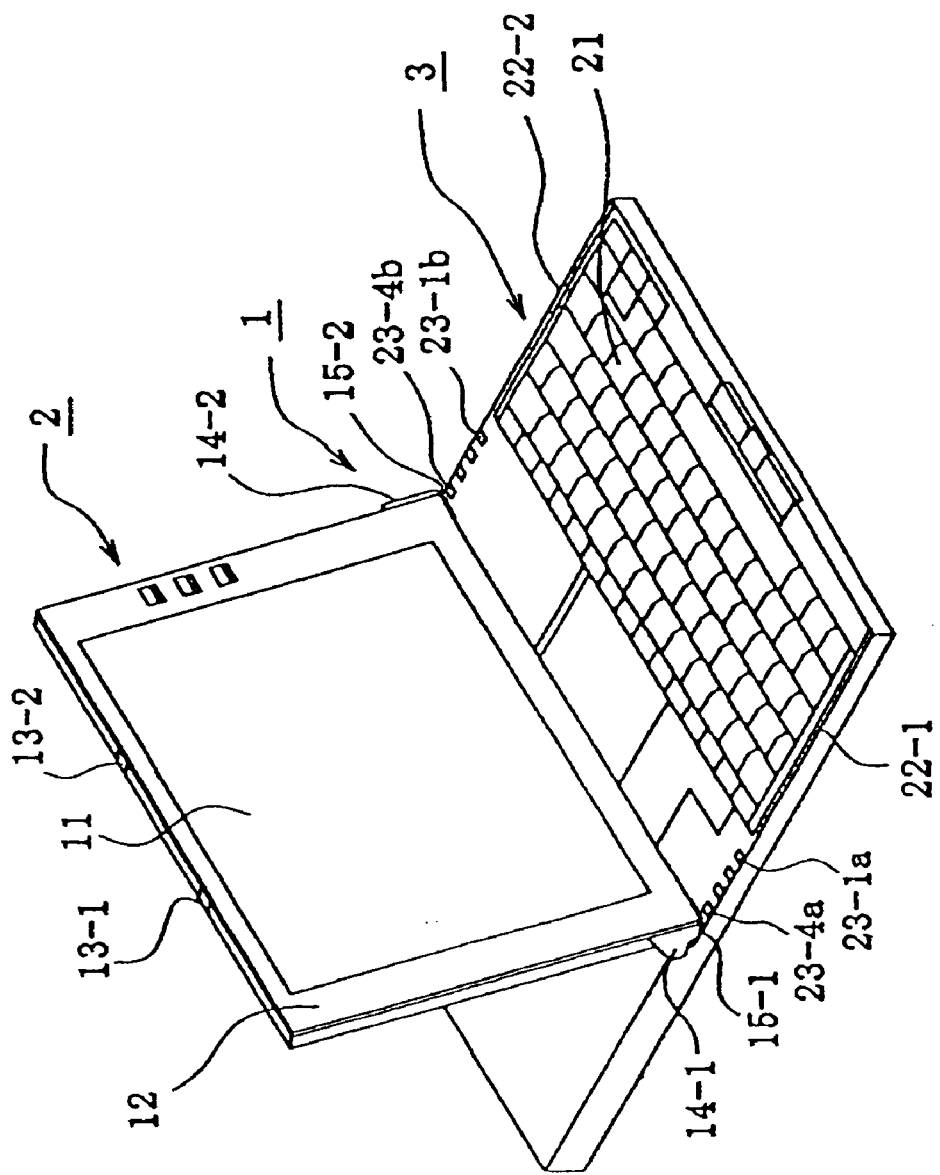
FIG. 1 is a diagram showing a configuration of an exemplary notebook PC to which the present invention is directed.

FIG. 1 shows a configuration of an exemplary notebook PC to which the present invention is directed. In the example shown in FIG. 1, the notebook PC 1 according to the present invention consists of an LCD panel 2 and a PC body 3. The LCD panel 2 and the PC body 3 are connected by a fixing mechanism of hinges and arm, which are hidden in FIG. 1 behind the LCD panel 2 and will be described later in detail.

The LCD panel 2 consists of a display portion 11 of an LCD and an LCD assembly 12 that supports the LCD. On the top of the LCD assembly 12 are provided latch holders 13-1 and 13-2 for fixing the LCD panel 2 and the PC body 3 together when the LCD panel 2 is stored on the PC body 3. Further, side fins 14-1 and 14-2 are provided on both sides of the bottom of the LCD panel 2, and projections 15-1 and 15-2 are provided to the side fins 14-1 and 14-2. These side fins 14-1, 14-2 and projections 15-1, 15-2 will be described later in detail.

The PC body 3 has a keyboard 21. The PC body 3 also has sidewalls 22-1 and 22-2 on both sides of the keyboard 21, and a pair of depressions 23-1$a$ and 23-1$b$ and four more pairs of depressions (23-2$a$ through 23-5$a$ and 23-2$b$ through 23-5$b$) respectively on both sides of the PC body 3 beyond the keyboard 21. These sidewalls 22-1 and 22-2, and depressions 23-1a through 23-5a and 23-1b through 23-5b, will be described later in detail.

Figure 2:
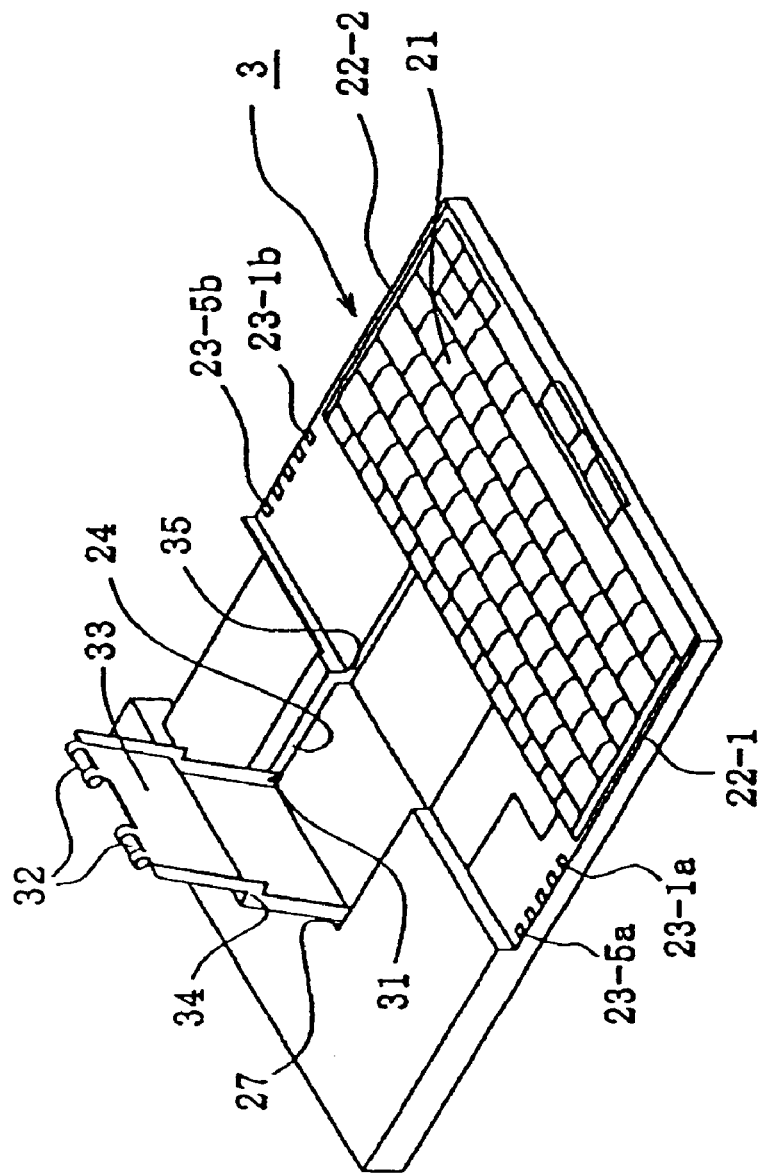
FIG. 2 is a diagram for illustrating a method for fixing an LCD panel according to the present invention.
Figure 3:
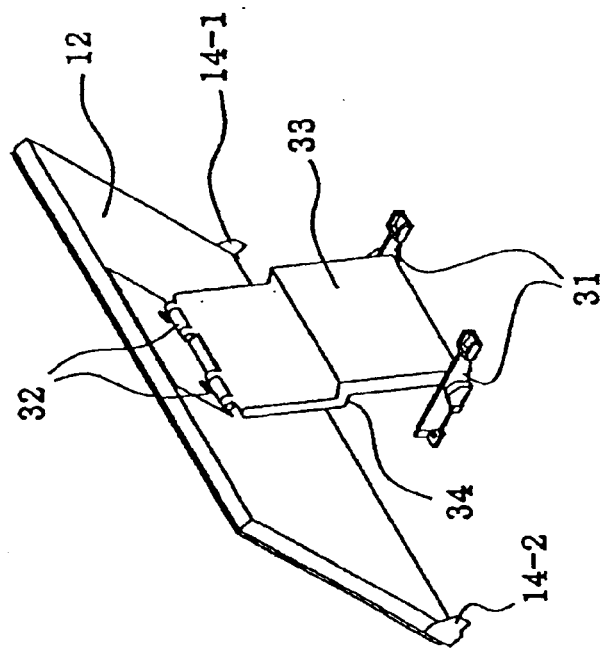
FIG. 3 is a diagram for illustrating the method for fixing the LCD panel according to the present invention.

Now, a method for fixing the LCD panel 2 according to the present invention will be described with reference to FIG. 2 and 3. In the examples shown in FIGS. 2 and 3, for fixing the LCD panel 2 to the PC body 3, a first hinge 31 is provided at a concavity portion 24 on the PC body 3 as shown in FIG. 2, a second hinge 32 is provided on the LCD panel 2 slightly above the center line of the LCD assembly 12 as shown in FIG. 3, and further, the first hinge 31 and the second hinge 32 are rotatably connected by a plate-shaped arm 33. In the examples shown in FIGS. 2 and 3, the first hinge 31 is preferably configured to rotate 0° through 90° given that the main surface of the notebook PC 1 is 0°, and the second hinge 32 is preferably configured to rotate 0° through 180° given that a plane parallel to the arm 33 is 0°. The arm 33 has a stepped portion 34 that engages with a stepped portion 35 provided on the PC body 3 so that the arm 33 does not interfere with the LCD panel 2 to be stored on the PC body 3.

In using the above-described notebook PC 1 for operations such as information input, it can be in various modes in which the display portion 11 of the LCD panel 2 stands at different angles (modes 1 through 6) by choosing the angles of the first hinge 31 and the second hinge 32. Now, these modes will be described below in conjunction with necessary parts for realizing the modes.

Figure 4:
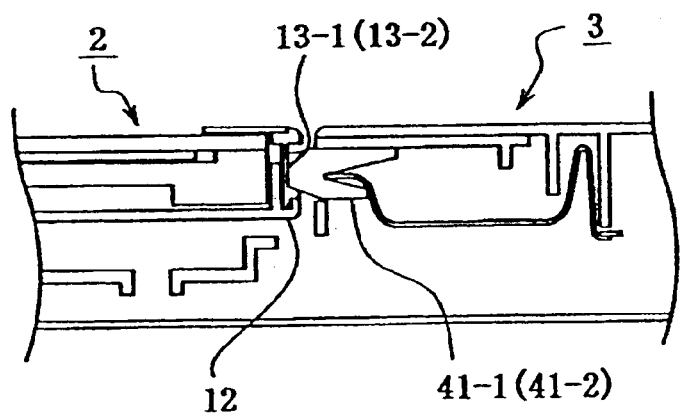
FIG. 4 is a diagram for illustrating a configuration of spring latches according to the present invention.

Mode 1 is the mode in which the angle of the display portion 11 is 0°. This is when a user does not use the keyboard 21 and uses the display portion 11 as a touch panel looking down from directly above the display portion 11. As shown in FIG. 4, the latch holders 13-1 (13-2) at the top of the LCD panel 2 have latches 41-1 (41-2) which are provided at corresponding positions on the PC body 3 and which are unlocked by force above a certain level. The latch is preferably energized by an elastic part such as a spring whose one end is fixed to the body of the notebook PC 1. A first purpose of the latches 41-1 (41-2) is to close the LCD panel 2 evenly at the angle of 0° with a single motion. Generally, it is difficult to completely close the LCD panel 2 due to friction remaining at the first and second hinges 31 and 32 and deflection of the LCD panel 2. However, the spring latches 41-1 (41-2) can force the LCD panel 2 to be evenly closed with a single motion. A second purpose of the spring latches is to keep the LCD panel 2 stable when the notebook PC 1 is closed. When the notebook PC 1 is closed, it is lifted and rotated 180°. Then, the LCD panel 2 may drop off because it is put facedown. The spring latches 41-1 (41-2) prevent this drop of the LCD panel 2.

Figure 5:
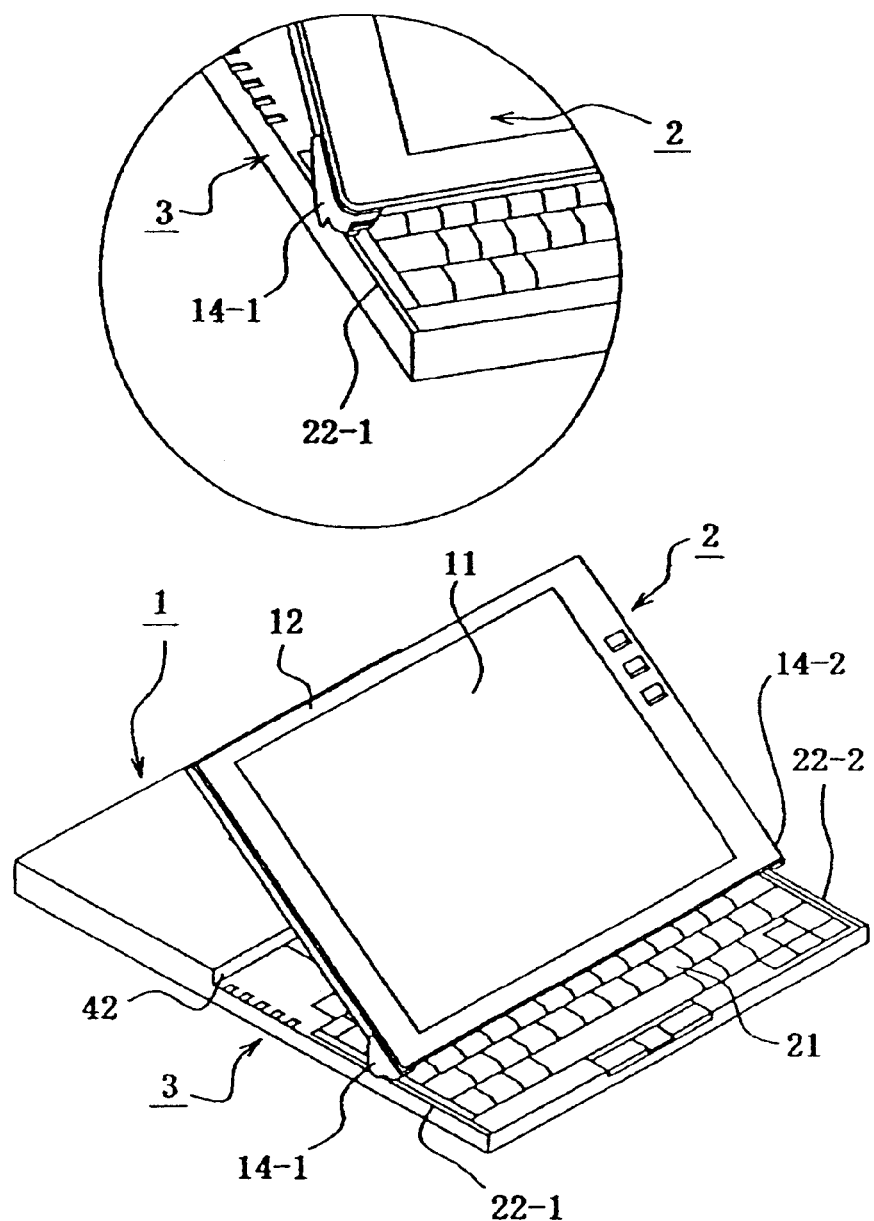
FIG. 5 is a diagram for illustrating an example of the method for fixing the LCD panel according to the present invention.
Figure 6:
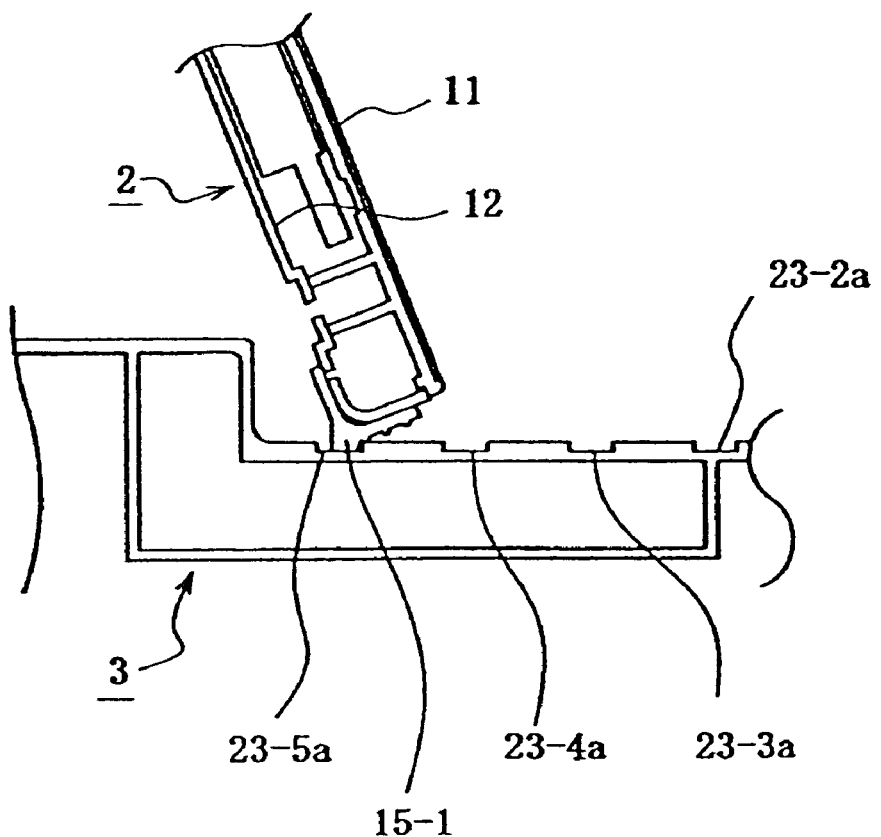
FIG. 6 is a diagram for illustrating the method for fixing the LCD panel shown in FIG. 1 in detail.

Mode 2 is the mode in which the LCD panel 2 is slightly tilted. In handwritten input, downward force is applied on the LCD panel 2. Here, to prevent the LCD panel 2 from slipping down, the side fins 14-1 and 14-2 are put on the projections 22-1 and 22-2 provided on both sides of the keyboard 21 on the PC body 3 to fix the LCD panel 2, as exemplified in FIG. 5. The torque of the first and second hinges 31 and 32 also aid in fixing the LCD panel 2 to some extent. Lifting the LCD panel 2 or forcedly pressing it down loosens the side fins 14-1 and 14-2 to unlock the LCD panel 2.

In mode 3, the angle of the LCD panel 2 is rather greater. Thus, the downward force component is smaller, and only the torque of the first and second hinges 31 and 32 fixes the LCD panel 2. The side fins 14-1 and 14-2 are put on an edge 42 on a side of the keyboard 21 (see FIG. 5) to fix the LCD panel 2.

In mode 4, in which the angle of the LCD panel 2 is further greater, the downward force component is smaller, and a horizontal force component prevails accordingly. Particularly, a component to lift the display portion is developed. Thus, it is necessary to fix the LCD panel 2 against these forces of two directions. For this purpose, the projections 15-1 and 15-2 provided on the bottom edges of the LCD panel 2 engage with the depressions 23-1a through 23-5a and 23-1b through 23-5b beyond the keyboard 21 so that the LCD panel 2 is locked along the horizontal direction as shown in FIGS. 1 through 6. The projections 15-1 and 15-2, and the depressions 23-1a through 23-5a and 23-1b through 23-5b, are wedge-shaped to fit each other.

The backmost depressions 23-5a and 23-5b can fix the LCD panel 2 in a different way as follows. When the LCD panel 2 is to be fixed to the most upright position as in FIG. 1, it is moved to the maximum rotation position where the arm 33 touches the stepped portion 27 as in FIG. 2, and then it is directed upright. Now, the bottom of the LCD panel 2 interferes with the horizontal plane of the PC body at a position in front of the depressions 23-5a and 23-5b. Then, the arm 33 and the LCD panel 2 are flexed by a further force to allow the second hinge 32 to rotate, so that the projections 15-1 and 15-2 engage with the backmost depressions 23-5a and 23-5b. This configuration is preferred in that the projections deeply engage with the depressions and the LCD panel is firmly fixed.

Mode 5 is a mode in which the bottom of the LCD panel 2 is completely suspended above the PC body 3. This mode is used in such a situation that a user looks down the display portion 11 of the LCD panel 2 at a place where only a little space is available in front of the user, such as in a seat on an airplane. The LCD panel 2 is fixed only by the forces of the first and second hinges 31 and 32.

Mode 6 is used when a user shows the display portion 11 of the LCD panel 2 to a person in front of the user. The first hinge 31 is rotated almost 90° while the second hinge 32 is kept at the angle of 0°. Display on the display portion 11 is flipped by 180° with software.

Figure 7:
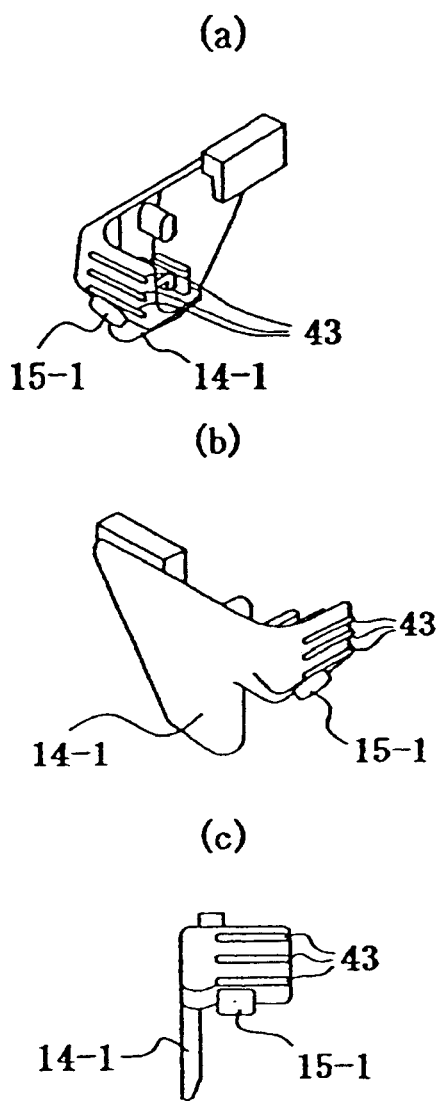
FIGS. 7($a$) through ($c$) are diagrams each showing an exemplary structure of side fins and projections according to the present invention.
Figure 8:
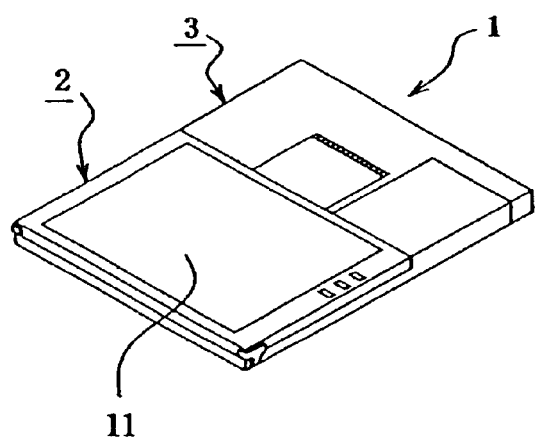
FIG. 8 is a diagram showing an example of the notebook PC with the LCD panel closed.
Figure 9:
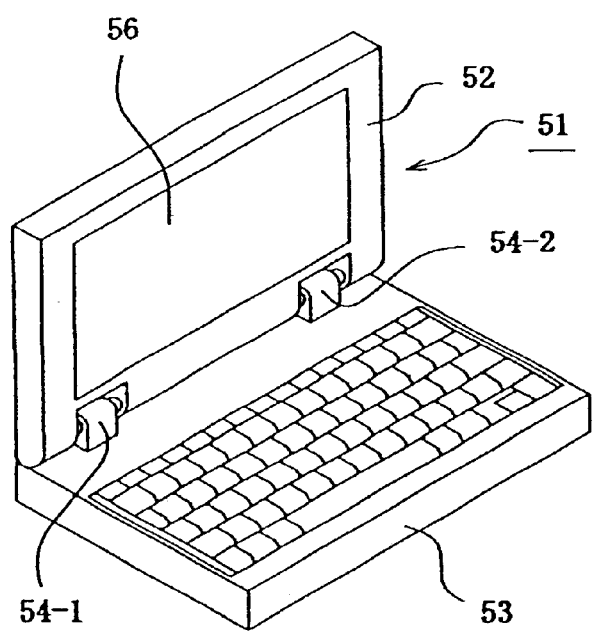
FIG. 9 is a diagram showing a configuration of a conventional notebook PC.

FIGS. 7(a) through (c) show an exemplary structure of the side fins 14-1 and 14-2 used in mode 2 and 3, and of the projections 15-1 and 15-2 used in mode 4. As shown in FIG. 7(a) through (c), the side fin 14-1 (only one of the side fins is shown here) and the projection 15-1 are integrally structured. Further, above the projection 15-1 are provided convex portions 43, which prevent the LCD panel 2 from slipping when the LCD panel 2 is raised from the state shown in FIG. 8 with fingers put on the edges of the LCD panel 2.

As apparent from the foregoing description, a first hinge is provided on a PC body, a second hinge is provided on an LCD panel, and an arm rotatably connects the first and second hinges. Thus, the present invention enables the LCD panel to be fixed to any position so that operations such as information input can be performed without loss of usability.

What is claimed is:

1. A computer comprising:
   a body, the body having a depressed keyboard region and a non-depressed stepped region;
   a monitor panel having a panel back and a panel front;
   a thin monitor mounted in the monitor panel such that a display portion of the thin monitor is viewable at the panel front; and
   an arm including:
      a first hinge connecting a first end of the arm to a concavity portion of the non-depressed stepped region, the first hinge being configured to rotate the arm 0° to 90°, with 0° being co-planar with a top portion of the non-depressed stepped region and parallel with the depressed keyboard region, and a second hinge connecting a second end of the arm to the panel back, the second hinge being configured to rotate the panel back 0° to 180°, with 0° being parallel with the arm, wherein the monitor panel is capable of being oriented co-planar with the non-depressed stepped region when the monitor panel is positioned to only cover all of the depressed keyboard region while the display portion is viewable.

2. The computer of claim 1, wherein the first end and second end of the arm are not planar.

3. The computer of claim 1, wherein the thin monitor is a touch panel.

4. The computer of claim 1, further comprising:

a latch mounted in the non-depressed stepped region; and a latch holder mounted in a top of the monitor panel, wherein the latch and the latch holder mate when the monitor panel is positioned to only cover all of the depressed keyboard region.

5. The computer of claim 4, wherein the latch is spring loaded, such that the latch is pressed into the latch holder when the monitor panel is positioned to only cover all of the depressed keyboard region.

6. A computer comprising:

a body, the body having a depressed keyboard region and a non-depressed stepped region;

a monitor panel having a panel back and a panel front;

a thin monitor mounted in the monitor panel such that a display portion of the thin monitor is viewable at the panel front;

an arm including:

a first hinge connecting a first end of the arm to a concavity portion of the non-depressed stepped region, the first hinge being configured to rotate the arm 0° to 90°, with 0° being co-planar with a top portion of the non-depressed stepped region and parallel with the depressed keyboard region, and a second hinge connecting a second end of the arm to the panel back, the second hinge being configured to rotate the panel back 0° to 180°, with 0° being parallel with the arm;

a pair of side fins mounted to sides of the monitor panel, wherein each of the side fins extends past a thickness of the monitor panel, and wherein each of the side fins has a fin projection extending from the side fin;

a pair of side projections on each side of the depressed keyboard region, wherein the pair of side projections are lateral to a keyboard in the depressed keyboard region; and a plurality of depressions in the depressed keyboard region, wherein the depressions are located in an area that is not lateral to the keyboard in the depressed keyboard region, wherein the side fins secure the monitor panel to the side projections to prevent lateral movement of the monitor panel when the monitor panel is positioned over the keyboard, and wherein the fin projections secure the monitor panel to the depressions when the monitor panel is positioned away from the keyboard to prevent movement of the monitor panel in any direction.

7. The computer of claim 6, wherein the fin projections and the depressions are wedge-shaped to fit each other.

8. The computer of claim 6, wherein software flips a display on the display portion when the display portion is positioned away from the body and the display portion is physically inverted.

9. The computer of claim 6, wherein the thin monitor is a liquid crystal display (LCD) screen.

10. The computer of claim 6, wherein the thin monitor is a touch screen.

* * * * *